July 9, 1968 L. A. WADE 3,391,712
BLEEDER VALVE ASSEMBLY
Filed March 29, 1966
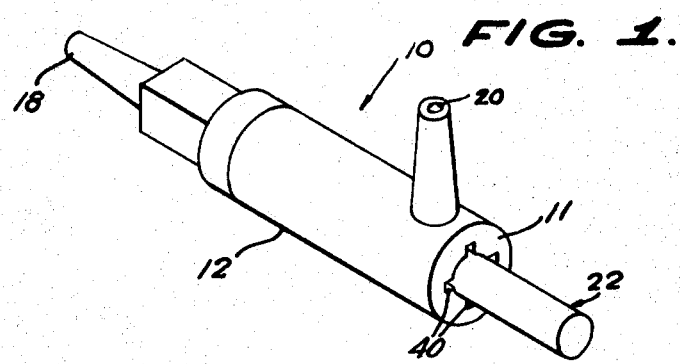
FIG. 1.
FIG. 3.
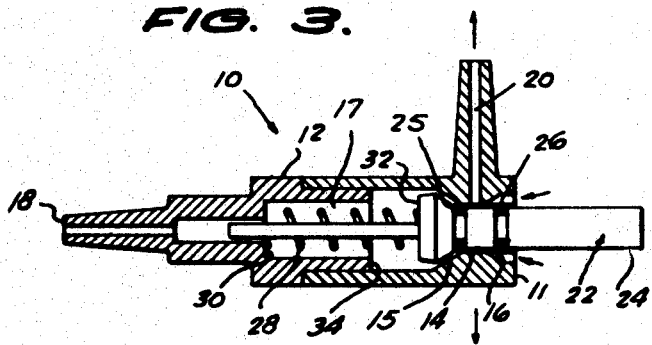
FIG. 2.
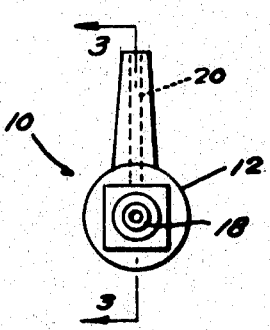
FIG. 4.
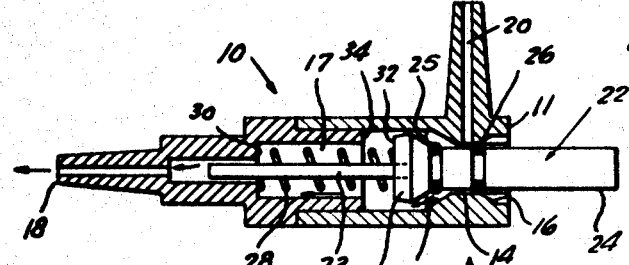
FIG. 5.
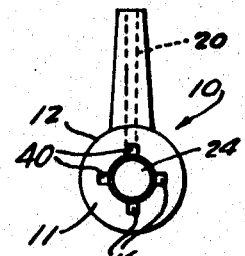
FIG. 6.
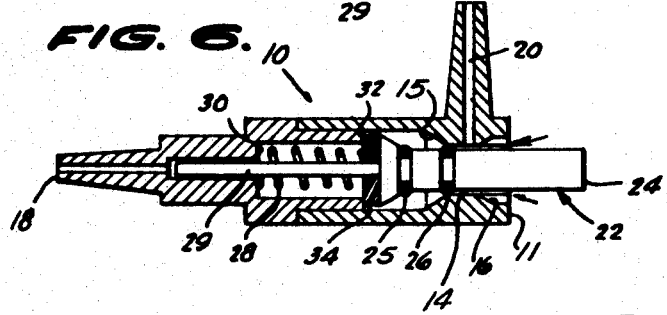
INVENTOR.
LEE A. WADE,
BY
Berman, Davidson-Berman
ATTORNEYS.

United States Patent Office 3,391,712
Patented July 9, 1968

3,391,712
BLEEDER VALVE ASSEMBLY
Lee A. Wade, Detroit, Mich., assignor to John E. Landino, Grosse Pointe Park, Mich.
Filed Mar. 29, 1966, Ser. No. 538,384
1 Claim. (Cl. 137—625.26)

ABSTRACT OF THE DISCLOSURE

A valve for connecting a source of vacuum to a device to be operated by such vacuum, said valve comprising a hollow body having opposed valve seats; a stem penetrating said body, a vacuum connection at one end of said body; a device connection intermediate said valve seats; valve members on said stem for alternate coaction with said seats and a spring biasing said stem to seal off said vacuum connection.

---

This invention relates to a bleeder valve assembly for use with a suction system.

An object of the present invention is to provide a bleeder valve assembly which, when incorporated in a suction system for driving a work element, is normally in a position to afford direct communication of the atmosphere with the work element, and which, at the will of the operator, may be shifted to a position to afford direct communication of the work element with the suction source without leakage, and to another position to release the work element from residuary pressure, without leakage.

Another object of the present invention is to provide a bleeder valve assembly which lends itself to incorporation in a suction system for driving a work element, with facility and ease.

A further object of the present invention is to provide a bleeder valve assembly which, when incorporated in a suction system for driving a work element, is positive in action, leakage-free, and highly efficient.

Other objects and advantages of the present invention will become apparent from the following description taken in conjunction with the accompanying drawings, in which:

FIGURE 1 is a perspective view of a bleeder valve assembly according to the present invention.

FIGURE 2 is an end view taken from the left-hand side of the valve assembly of FIGURE 1.

FIGURE 3 is a longitudinal sectional view taken on the line 3—3 of FIGURE 2, illustrating the valve assembly in normal or disuse position.

FIGURE 4 is a longitudinal sectional view of the assembly of FIGURE 3, but illustrating the valve assembly in one of its positions of use.

FIGURE 5 is an end view taken from the right-hand side of the valve assembly of FIGURE 1.

FIGURE 6 is a longitudinal sectional view of the assembly of FIGURE 4, but illustrating the valve assembly in the other of its positions of use.

Referring to the drawings, the numeral 10 designates, generally, the bleeder valve assembly according to the present invention, the assembly comprising an elongated casing 12 which is provided with a chamber 14 intermediate its ends 15 and 16. The ends 15 and 16 of the chamber 14 are opposed to each other and each is beveled so as to provide guides for first and second valve rings 25 and 26 to be subsequently described. The casing is provided with a first passage 17 which has one end opening into one end or the beveled end 15 of the chamber 14 and extends from the chamber 14 and opens out of one end or end 18 of the casing 12, the end 18 of the casing 12 being adapted to be connected to a source of suction of a suction system for actuating a work element, not shown. The casing 12 is also provided with a second passage 20 which has one end opening into the chamber 14 between its beveled ends 15 and 16 and which has the other end adapted to be connected to the work element to be driven of the suction system, not shown.

An elongated stem 22 extends through the chamber 14 and has the portion 23 adjacent one end extending out of one of the beveled ends or end 15 of the chamber 14 and into the first passage 17, the portion 24 of the stem 22 adjacent the other end extending out of the other of the beveled ends or end 16 of the chamber 14 and projecting out of and beyond the other end 11 of the casing 12. The one end stem portion 23 is smaller in cross-section than the first passage 17 so as to provide a space between the one stem portion 23 and the first passage 17.

First and second valve rings 25 and 26 are on the one end portion 23 of the stem 22 and are located so that the first valve ring 25 may coact with the one beveled end 15 of the chamber 14 adjacent the first passage 17 and the adjacent part of the wall of the chamber 14, and the second valve ring 26 may coact with the other beveled end 16 of the chamber 14 adjacent the other end 11 of the casing 12 and the adjacent part of the wall of the chamber 14. Spring means is operatively-connected to the one stem portion 23 for biasing the first valve ring 25 into frictional engagement with the wall of the chamber 14 at the beveled end 15 of the chamber 14. The spring means embodies a coil spring 28 which is circumposed about the one stem portion 23 and has one end bearing against an enlarged portion or a stop collar 29 on the one stem portion 23 and has the other end bearing against a shoulder 30 formed in and protruding from the inner wall of the first passage 17 inwardly of and adjacent the end 18 of the casing 12. It is to be noted that the stop collar 29 is resilient in character and is beveled, the face of the collar 29 which is remote from the valve ring 25, serving as a valve seat 32, which is in seating engagement at times with a valve seat 34 formed in the first passage 17 inwardly of and spaced from the shoulder 30.

Reverting to FIGURE 3, such figure shows the valve assembly in normal or disuse position. In this position, the first valve ring 25 is in frictional engagement with the wall of the chamber 14 between the one beveled end 15 of the chamber 14 and the one end of the second passage 20 opening into the chamber 14, and the second valve ring 26 is spaced from the other of the beveled ends or end 16 and spaced from and contiguous to the other end 11 of the casing 12 whereby affording communication from the atmosphere through the space between the second valve ring 26 and the other of the beveled ends or the end 16 of the chamber 14 and the other end 11 of the casing 12 into the chamber 14 and out of the chamber 14 into and through and out of the second passage 20 to the work element, and without leakage. Grooves or flutes 40 are formed adjacent the end 16 to guide the stem and to give access to the atmosphere.

The valve assembly may be shifted from the position in which the first valve ring 25 is in frictional engagement with the wall of the chamber 14 between the beveled end 15 of the chamber 14 and the one end of the second passage 20 opening into the chamber 14, the position of FIGURE 3, to a first position of use or the position of FIGURE 4 wherein the first valve ring 25 is out of frictional engagement with the wall of the chamber 14 between the one beveled end 15 of the chamber 14 and the one end of the second passage 20 opening into the chamber 14 and into the first passage 17 and the second valve ring 26 is in frictional engagement with the wall of the chamber 14 between the other of the beveled ends or end 16 of the chamber 14 and the one end of the second passage 20 opening into the chamber 14 whereby affording communication from the second passage 20 into and through the chamber 14 and out of chamber 14 around the first valve ring 25 and collar 29 and through the space between the one stem portion 23 and the first passage 17 into and out of the first passage 17 to the suction source of the suction system, not shown. This may be effected by application of a depressive force to the projecting stem portion 24 of such magnitude to partially compress the spring 20 and lock the valve ring 26 in frictional engagement with the wall of the chamber 14 between the second passage 20 and the beveled end 16 of the chamber 14.

The valve assembly may be shifted from the first position of use in which the first valve ring 25 is out of frictional engagement with the wall of the chamber 14 between the one beveled end 15 of the chamber 14 and the one end of the second passage 20 opening into the chamber 14 and into the first passage 17 and the second valve ring 26 is in frictional engagement with the wall of the chamber 14 between the other of the beveled ends or end 16 of the chamber 14 and the one end of the second passage opening into the chamber 14, the position of FIGURE 4, to a second position of use or the position of FIGURE 5, wherein the first valve ring 25 is wholly within the first passage 17 and spaced inwardly of the one beveled end or end 15, the second valve ring 26 is in frictional engagement with the wall of the chamber 14 between the one beveled end or end 15 and the one end of the second passage 20 opening into the chamber 14, and the valve seat or washer 32 of the stop collar 29 is in seating engagement with the valve seat 34 formed in the first passage 17, whereby affording communication from the atmosphere through the end 11 of the casing 12 into and around the space between the stem portion 24 into the chamber 14 and out of said chamber into and out of the one end of the second passage 20 to the work element, without leakage, to thereby release the work element of residuary pressure. This may be effected by application of a depressive force to the projecting stem portion 24 of such magnitude to completely compress the spring 28 and seal off the first passage 17 by virtue of the seating position of the second valve ring 26 and valve seat 34.

What is claimed is:

1. A valve for connecting a source of vacuum to a device to be operated by application of said vacuum, said valve comprising a hollow cylindrical body portion having therein a cylindrical portion of constricted internal diameter; oppositely directed beveled portions at each end of said constricted portion; a second hollow cylindrical body portion having one end fitting telescopically within said first-named body portion to define therewith an annular shoulder, said second body portion having a connection for a source of vacuum; said first-named body portion having a tubular connection for a device to be operated, said tubular connection communicating with said constricted portion; a valve stem penetrating both said body portions; said first-named body portion having at one end spaced, radial grooves surrounding said valve stem, the material of said body portion intermediate said grooves acting to guide said valve stem and said grooves extending inward to one of said beveled portions; said valve stem having circumferential grooves axially spaced to lie on opposite sides of said beveled portions to engage the same; an enlarged portion of said valve stem located inwardly from said constricted portion; a washer surrounding said stem and bearing on said enlarged portion; a spring surrounding said valve stem, said spring bearing at one end on said washer and at the other end on an annular shoulder formed in said second body portion, said spring normally biasing said valve stem outwardly of said first body portion to engage the innermost of said sealing rings with the innermost of said beveled portions to seal off said device connection from said vacuum connection; said valve stem, upon inward movement acting to move the outermost sealing ring into engagement with the outermost of said beveled portions to seal off the atmosphere and to move the innermost of said sealing rings out of engagement with the innermost of said bevel portions to connect said vacuum source to said device connection, further inward movement of said valve stem acting to bring said washer into engagement with said shoulder to seal off said vacuum source and to bring said outermost sealing ring into engagement with the innermost bevel portion to retain said valve stem in said position against the action of said spring.

References Cited
UNITED STATES PATENTS

| | | | |
|---|---|---|---|
| 2,645,451 | 7/1953 | Gladden | 137—625.27 X |
| 3,016,917 | 1/1962 | Hunt | 137—625.27 |
| 3,249,123 | 5/1966 | Berg | 137—625.26 |

FOREIGN PATENTS 1,313,948  11/1961  France.

HENRY T. KLINKSIEK, *Primary Examiner.*